Patented Feb. 3, 1925.

1,524,783

UNITED STATES PATENT OFFICE.

ROLLAND CURTNER, OF MARION, INDIANA, ASSIGNOR TO RUMFORD CHEMICAL WORKS, OF PROVIDENCE, RHODE ISLAND, A CORPORATION OF RHODE ISLAND.

PREPARATION FOR BREAD MAKING.

No Drawing. Application filed May 29, 1924. Serial No. 716,689.

*To all whom it may concern:*

Be it known that I, ROLLAND CURTNER, a citizen of the United States, residing at Marion, county of Grant, State of Indiana, have invented certain new and useful Improvements in Preparations for Bread Making, of which the following is a specification.

In the baking of bread and particularly in bread making by the commercial baker as distinguished from the domestic bread making, various problems are involved both as to the character of the resultant loaf and as to the ingredients used. Quality both as to fineness and lightness is a prime requisite but the expense of flours and other ingredients is of great practical importance. It has usually been found that the highest quality of wheat involves rather too much expense for the ordinary loaf demanded by the public, and the problem has been to give the public the best possible quality of bread that could be produced under given conditions for the price which is usually fixed by them. This has usually meant in the trade that wheats of lower grade had to be used or blends of higher and lower grades employed. It is increasingly difficult to get lightness and fine texture with such flours and a great variety of practices and materials have been tried to give to the bread made from lower grades of flour those desirable qualities which are more readily obtained from the expensive flour. The so-called low grade flours are in reality as nutritious and as valuable as foods as are the so-called high grade flours. The principal difference lies in the appearance of the bread as to whiteness and in the greater difficulty in making up the so-called low grade flours into bread which compares favorably in lightness and texture. It is therefore of great economical importance to conserve these flours by providing means for utilizing them for acceptable first class bread making instead of being compelled to use them for other purposes.

I have discovered that the quality of bread made from any grade of flour may be improved both as to lightness and fineness of texture by the addition of a gum of certain characteristics. The gum that I find most advantageous is what is known as gum tragacanth, but I believe that there are other similar gums that may prove to be advantageous, although of those tried out by me the gum tragacanth seems to be best. This gum has been used in the confectionery trade for a long time and is well known as having no harmful properties if eaten. Its uses in the candy trade, however, have been very different from its use in bread. The peculiar part about its use in bread making is that only a very slight amount of it is needed to give the desired results. In this it differs essentially from its part in the candy making trade where it is depended upon to form a body for paste or like confections. For example, in bread making I take for any usual batch of flour, say of standard barrel weight, only one-half ounce of gum tragacanth. This I carefully powder and mix well with one and one-half ounces of salt and sufficient starch to make a pound. I work the gum entirely through the body of the flour or starch and then in turn work the body of the flour or starch carefully through the entire batch of one barrel of flour which I use for my dough. The dough is then mixed up with the yeast and other ingredients and raised and baked in the usual manner. For any given flour and previous system of baking this slight addition shows marked improvements in the result. Not only does the dough work better in handling but the loaves produced are very light and of very fine grain. They also have an unusual freshness and keep much longer than bread otherwise made. In fact, such bread seems to keep fresh at least half again as long as ordinary bread under the same conditions.

I am not able to explain exactly what happens in the mixing and in the baking. I can only point out to the practical baker results that are perfectly definite.

As I have said before, there may be other gums as good as gum tragacanth, but in my own experience I find this gum best, although rather more expensive. There are other gums that I am told come from similar sources which give improved results, but I recommend gum tragacanth as the one I have found to be of highest efficiency. In claiming my invention therefore I do not wish to be limited to the use of gum tragacanth alone nor to the exact amounts as they may be found to vary with different gums and different flours. All similar gums and all similar amounts and all manners of mixing are to be understood as included in my invention or discovery as defined in the following claims.

What I therefore claim and desire to secure by Letters Patent is:

1. In the making of yeast leaven bread, the addition to the flour therefor of a pulverized vegetable gum of the class described dispersed therein.

2. In the making of yeast leaven bread, the addition to the flour therefor of a pulverized vegetable gum of the class described dispersed therein in an edible medium of vegetable origin in mixing, raising and baking.

3. In the making of yeast leaven bread, the addition to the flour therefor of pulverized gum tragacanth of the class described dispersed therein in mixing, raising and baking.

4. A bread made from a flour mixture having a pulverized vegetable gum uniformly distributed therein and glutenously effective to hold the leavening gases.

5. A bread made from a flour mixture having pulverized gum tragacanth distributed therein and glutenously effective to hold the leavening gases.

In testimony whereof I affix my signature in presence of two witnesses.

ROLLAND CURTNER.

Witnesses:
CORNELIA J. COLLINS,
H. H. BLINN.